US006823911B1

(12) United States Patent
Himuro

(10) Patent No.: US 6,823,911 B1
(45) Date of Patent: Nov. 30, 2004

(54) PNEUMATIC TIRE INCLUDING PSEUDO-LAND PORTION FORMED IN CIRCUMFERENTIAL GROOVE

(75) Inventor: Yasuo Himuro, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/674,039

(22) PCT Filed: Feb. 23, 2000

(86) PCT No.: PCT/JP00/01026

§ 371 (c)(1),
(2), (4) Date: Oct. 25, 2000

(87) PCT Pub. No.: WO00/51831

PCT Pub. Date: Sep. 8, 2000

(30) Foreign Application Priority Data

Feb. 26, 1999 (JP) ............................................ 11-049516
May 14, 1999 (JP) ............................................ 11-134218

(51) Int. Cl.$^7$ ........................ B60C 11/13; B60C 101/00; B60C 103/04; B60C 115/00
(52) U.S. Cl. ............................ 152/209.15; 152/209.18; 152/209.21; 152/209.28
(58) Field of Search ........................ 152/209.15, 209.18, 152/209.21, 209.26, 209.28, 209.19, 209.24

(56) References Cited

U.S. PATENT DOCUMENTS

| | | | | |
|---|---|---|---|---|
| 3,682,220 A | * | 8/1972 | Verdier ................... | 152/209.14 |
| 4,690,189 A | * | 9/1987 | Bradisse et al. | |
| 4,796,683 A | | 1/1989 | Kawabata et al. | |
| 5,386,861 A | * | 2/1995 | Overhoff et al. | |
| 5,549,146 A | | 8/1996 | Trabandt et al. | |
| 5,609,699 A | * | 3/1997 | Himuro | |
| 5,658,404 A | * | 8/1997 | Brown et al. | |
| 5,707,461 A | * | 1/1998 | Himuro | |
| 5,714,021 A | * | 2/1998 | Ochi | |
| 6,105,643 A | * | 8/2000 | Rohweder et al. | |
| 6,112,788 A | * | 9/2000 | Ikeda | |
| 6,123,129 A | * | 9/2000 | Himuro | |
| 6,138,728 A | * | 10/2000 | Miyazaki | |
| 6,213,180 B1 | * | 4/2001 | Himuro | |
| 2001/0017177 A1 | * | 8/2001 | Himuro | |
| 2002/0062892 A1 | * | 5/2002 | Himuro | |

FOREIGN PATENT DOCUMENTS

| | | | |
|---|---|---|---|
| EP | 325905 | * | 8/1989 |
| EP | 867310 | * | 9/1998 |
| JP | 2-241805 | * | 9/1990 |
| JP | 3-86605 | * | 4/1991 |
| JP | 5-319025 | * | 12/1993 |
| JP | 6-270609 | | 9/1994 |
| JP | 8-85309 | | 4/1996 |
| JP | 9-2024 | * | 1/1997 |
| JP | 9-2025 | | 1/1997 |
| JP | 10-16515 | | 1/1998 |
| JP | 11-180114 | | 7/1999 |
| JP | 11-263103 | * | 9/1999 |
| WO | WO 95/18022 | | 7/1995 |
| WO | WO 97/27070 | | 7/1997 |

OTHER PUBLICATIONS

Machine translation for Japan 11–263103.*
Machine translation for Japan 6–270609.*
Machine translation for Japan 9–2024.*
Patent Abstracts of Japan, vol. 1998, No. 11, Sep. 30, 1998 (JP 10–166814).

* cited by examiner

Primary Examiner—Steven D. Maki
(74) Attorney, Agent, or Firm—Sughrue Mion, PLLC

(57) ABSTRACT

There is provided a pneumatic tire, particularly a high-performance tire capable of effectively enhancing a drainage property without sacrificing the other tire properties, wherein a pseudo-land portion (11) promoting a smooth inflow of water flowing in circumferential grooves (3), (4) into slant grooves (7a), (7b) is formed in the circumferential groove (3), (4).

34 Claims, 12 Drawing Sheets

I–I section

II–II section

III–III section

I-I section

II-II section

III-III section

I-I section

II-II section

III-III section

I-I section

II-II section

III-III section

I-I section

II-II section

III-III section

IV-IV section

PNEUMATIC TIRE INCLUDING PSEUDO-LAND PORTION FORMED IN CIRCUMFERENTIAL GROOVE

TECHNICAL FIELD

This invention relates to a pneumatic tire, particularly a high-performance tire capable of effectively enhancing a drainage property without sacrificing the other tire properties.

BACKGROUND ART

In the conventional pneumatic tire, particularly so-called high-performance tire reducing an aspect ratio for the purpose of improving a steering stability and the like, a tread pattern is general to be formed by combining a circumferential groove(s) extending along a circumferential direction of the tire with a plurality of slant grooves obliquely extending from the circumferential groove toward an end of a tread.

As a means for more improving a drainage property in such a tire, it is useful to increase a groove area ratio (a negative ratio) by widening a groove width in the circumferential groove or the slant groove.

That is, in the tire having the above tread pattern, the circumferential groove mainly plays a role for discharging water in forward and backward directions of the tire, and the slant groove mainly plays a role for discharging water toward the side of the tire, so that the drainage efficiency in the forward and backward directions and the sideward direction of the tire is enhanced by increasing the negative ratio in these grooves, and hence the improvement of the drainage property as a whole of the tire can be expected.

Moreover, as another means for enhancing the drainage property, it is useful to incline the slant groove at a small angle with respect to the circumferential direction of the tire to form so-called high angle groove and to arrange the slant grooves in a direction of successively entering into a ground contact region from an equator side of the tire toward the respective tread end side to form a directional pattern in a tread portion.

However, all of these means for enhancing the drainage property have naturally a limit from a viewpoint of ensuring the other tire performances.

The inventor has made detailed studies for more enhancing the drainage property without sacrificing other tire performances with respect to the tire wherein at least one circumferential groove and a plurality of slant grooves each obliquely extending from the circumferential groove toward the tread end from are arranged in the tread portion, and obtained the following knowledge.

That is, it has been confirmed that since the circumferential groove promoting the drainage in the forward and backward directions of the tire and the slant groove promoting the drainage in the sideward direction of the tire largely differ in the direction of the drainage, water flowing along the circumferential groove and water flowing along the slant groove collide with each other in an intersect portion between these grooves when water flows together or branches off in such a portion, and hence the disorder is caused in the flowing of water and also the air is entrapped to easily create air bubbles to obstruct the smooth flowing of water and as a result the drainage efficiency tends to lower.

Moreover, it has been confirmed that the drainage mechanism of the tire during the running of the tire under loading changes with the lapse of time, more concretely, the drainage in front of the tire through the circumferential groove is mainly caused just before a part of the tire contacts the ground and the discharge in the sideward direction of the tire through the slant groove rather than the discharge in the forward and backward directions of the tire through the circumferential groove is mainly caused just after such a portion of the tire contacts the ground (inclusive of ground contacting).

It is, therefore, an object of the invention to provide a pneumatic tire, particularly a high-performance tire capable of effectively enhancing the drainage property without sacrificing the other tire performances by arranging pseudo-land portions of an adequate shape in the circumferential groove.

DISCLOSURE OF THE INVENTION

In order to achieve the above object, the pneumatic tire according to the invention lies in that at least one circumferential groove extending along a circumferential direction of the tire and a plurality of slant grooves each opening to the circumferential groove and obliquely extending from such an opening position toward a ground contact end of a tread are arranged in a tread portion, and a pseudo-land portion(s) is formed in the circumferential groove so as to promote a smooth inflow of water flowing in the circumferential groove into the slant groove.

The pseudo-land portion is preferable (1) to be formed such that a cross sectional area thereof is gradually increased toward a given circumferential direction of the tire; (2) to be arranged in the circumferential groove so as to come an end part at a larger side of the cross sectional area of the pseudo-land portion close to the portion of the slant groove opened to the circumferential groove; (3) to be arranged adjacent to a first groove wall of the circumferential groove not opened to the slant groove; (4) to be fixed to the first groove wall or to be arranged separately from the first groove wall; (5) to have such a part closest to the slant groove opening to the circumferential groove that a height measured from a groove bottom of the circumferential groove is within a range of 10–60% of a maximum depth of the circumferential groove; and/or (6) to have such a slant surface that a height is gradually decreased toward the side of the slant groove opening to the circumferential groove.

And also, the slant surface of the pseudo-land portion is preferable (I) to be substantially a flat shape or substantially a curved shape. In addition, when the slant surface is substantially the curved shape, it is preferable that (II) a center of curvature is located outward from the slant surface in a radial direction of the tire or inward from the slant surface in the radial direction of the tire. Furthermore, it is preferable that (III) when the slant surface of the pseudo-land portion is projected onto a ground contact face of the tire, its shape is approximately triangular or trapezoidal; (IV) an oblique side opposite to a basic side successively enters in the ground contact face from a side near to a side wall of a rib-shaped land portion toward a side apart therefrom; (V) when the basic side and the oblique side are projected onto the ground contact face of the tire, the slant surface is isosceles triangular wherein their length are substantially equal to each other and an angle ($\alpha$) therebetween is within a range of not more than 20°; (VI) a position of an intersecting point between the basic side and the oblique side is arranged at a lowest side of the slant surface viewing the tire from a front face; (VII) a shape of the oblique side projected onto the ground contact face of the tire is a curved line in which a center of curvature is located outward in a widthwise direction of the tire; and/or (VIII) the basic side of the slant surface is substantially the same height position as a maximum height position of the first groove wall or is located inward from the maximum height position of the first groove wall in the radial direction of the tire.

Furthermore, it is preferable that a pair of circumferential grooves are arranged in the tread portion to form a rib-shaped land portion between these circumferential grooves. The rib-shaped land portion is preferable (i) to be continuously arranged in the circumferential direction of the tire; (ii) to have a center position in the width-wise direction substantially coincident with a pattern center position; and/or (iii) to have a cross angle (θ) between the slant surface and a ground contact face of the rib-shaped land portion or a phantom plane arranged in parallel to such a ground contact face within a range of 120–150° viewing at a section in the widthwise direction of the tire.

Moreover, it is preferable that a corner part of a land portion defined by the arrangements of the circumferential groove, slant grooves and/or tread end at the side of the equatorial plane of the tire is formed at an acute angle and arranged at a position entering in the ground contact region on the heels of the pseudo-land portion. And also, the corner part is preferable (a) be arranged on the same circumference of the tire as an intersecting point between a section of the pseudo-land portion having a maximum sectional area and the oblique side of the slant surface or on an extension line of the oblique side; (b) to be subjected to a chamfering, more preferably, a chamfering forming a smoothly curved shape; and/or (c) to be connected with the pseudo-land portion.

Furthermore, the slant groove opening to the circumferential groove is preferable to be arranged so as to separate away from the circumferential groove toward a given circumferential direction of the tire. In addition, it is preferable that all of the slant grooves each opening to each of the pair of circumferential grooves and extending toward the respective ground contact end of the tread are arranged in a direction of successively entering in the ground contact face from the side of the circumferential groove toward the side of the ground contact end to thereby form a directional pattern in the tread portion.

BEST MODE FOR CARRYING OUT THE INVENTION

Figure 1:
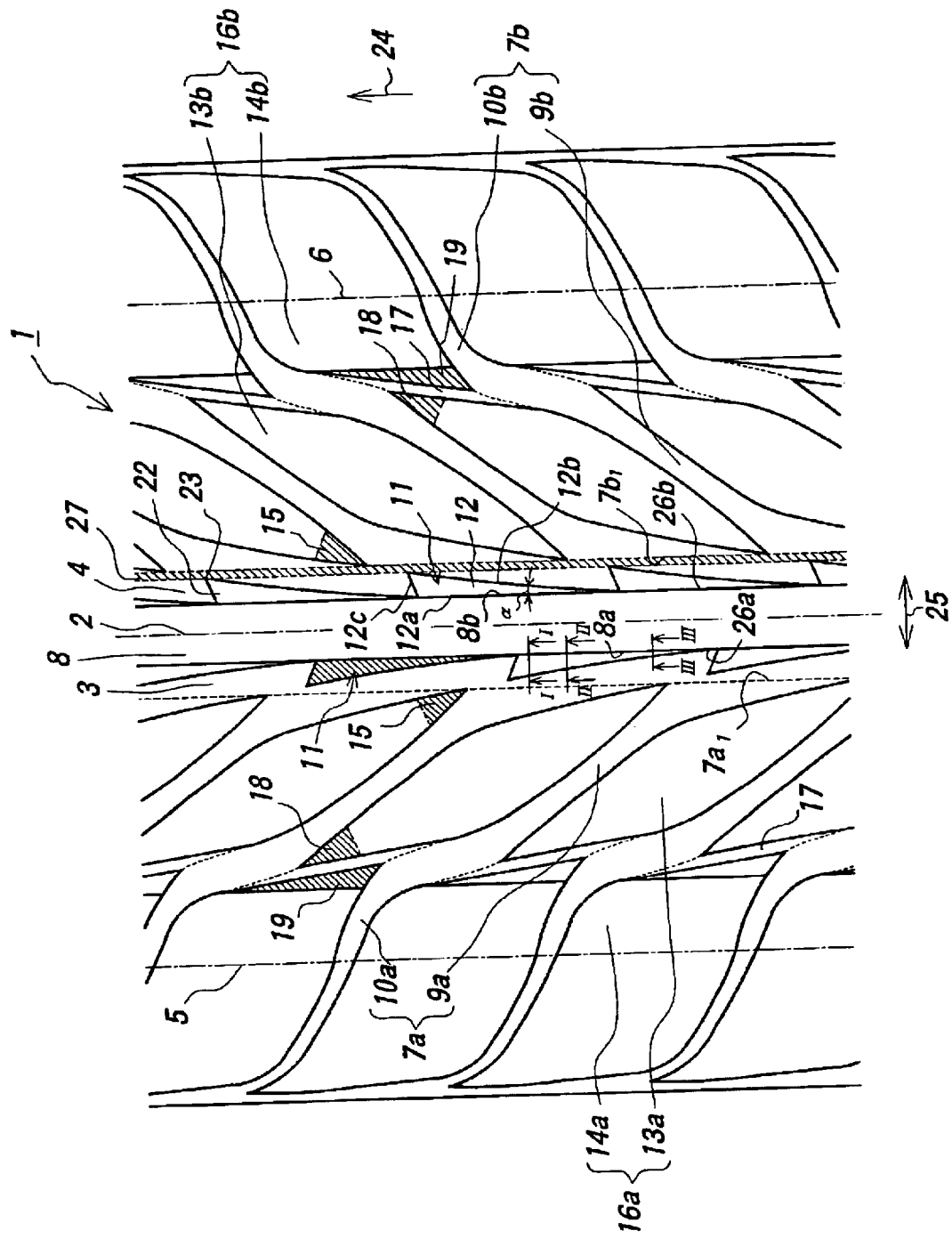
FIG. 1 is a diagrammatically partial developed view of a tread pattern in a pneumatic tire (Example 1) according to the invention.

In FIG. 1 is shown a tread pattern of the pneumatic tire according to the invention, in which numeral 1 is a tread portion, numeral 2 an equatorial plane of the tire, numerals 3 and 4 circumferential grooves, numerals 5 and 6 ground contact ends of the tread, numerals 7a and 7b slant grooves, numeral 11 a pseudo-land portion, and numeral 12 a slant surface.

In the pneumatic tire having a tread pattern shown in this figure, the tread portion 1, preferably a central region of the tread, is provided with at least one circumferential groove (two circumferential grooves 3 and 4 in FIG. 1) extending along the circumferential direction of the tire (the direction parallel to the equatorial plane 2 of the tire) and a plurality of slant grooves 7a and 7b opening to the circumferential grooves 3 and 4 and obliquely extending from these opening positions $7a_1$, $7a_2$ toward respective ground contact ends 5 and 6 of the tread. The slant grooves 7a and 7b are defined by leading and trailing groove walls in the circumferential direction of the tire.

A first feature in the construction of the invention lies in a point of arranging a pseudo-land portion 11 having an adequate shape in the circumferential groove 3, 4 to promote smooth inflow of water flowing in the circumferential groove 3, 4 into the slant grooves 7a, 7b. This feature is provided, for example, by extending axially inwardly a groove shape of the slant grooves 7a, 7b, as they extend toward the circumferential groove, by a second shape defined by an axially outer edge of the pseudo-land portion and the leading wall of the first slant groove. This is shown, for example, in FIGS. 1, 7, 8, 11 and 12. By adopting this construction, the drainage properties of the pneumatic tire are enhanced without sacrificing other tire properties.

The details of succeeding the invention will be described together with function below.

The inventor has made detailed studies for more enhancing the drainage property with respect to the tire comprising a tread portion provided with at least one circumferential groove 3, 4 and a plurality of slant grooves 7a, 7b obliquely extending from the circumferential groove 3, 4 toward the ground contact end 5, 6 of the tread from the circumferential groove 3,4, and obtained a knowledge that the drainage mechanism of the tire during the running of the tire under loading changes with the lapse of time, and more concretely, the drainage in front of the tire through the circumferential groove 3, 4 is mainly caused just before a part of the tire contacts the ground and the discharge in the sideward direction of the tire through the slant grooves 7a, 7b rather than the discharge in the forward and backward directions of the tire through the circumferential groove 3, 4 is mainly caused just after such a portion of the tire contacts the ground as previously mentioned.

The inventor has made various studies for improving the drainage property while taking the above drainage mechanism into consideration and found out that by forming the pseudo-land portion 11 in the circumferential groove 3, 4 so as to promote the smooth inflow of water flowing in the circumferential groove 3, 4 into the slant grooves 7a, 7b can be smoothly flowed water flowing in the circumferential groove 3, 4 just after the contact of a portion of the tire with the ground into the slant grooves 7a, 7b of different arranged angles and hence the drainage efficiency in the sideward direction of the tire through the slant grooves 7a, 7b just after the contact of the portion of the tire with the ground can be remarkably enhanced to effectively improve the drainage property of the tire, and as a result the invention has been accomplished.

The concrete construction of the invention will be explained in detail below.

The pseudo-land portion 11 is required to be arranged at a position in the circumferential groove 3, 4 capable of promoting the smooth inflow of water flowing in the circumferential groove 3, 4 into the slant grooves 7a, 7b of different arranged angles.

In order to promote the smooth inflow of water flowing in the circumferential groove 3, 4 into the slant grooves 7a, 7b, the shape of the pseudo-land portion 11, concretely the cross sectional area S thereof is preferable to be formed so as to gradually increase toward a given circumferential direction 24 of the tire.

Figure 2A:
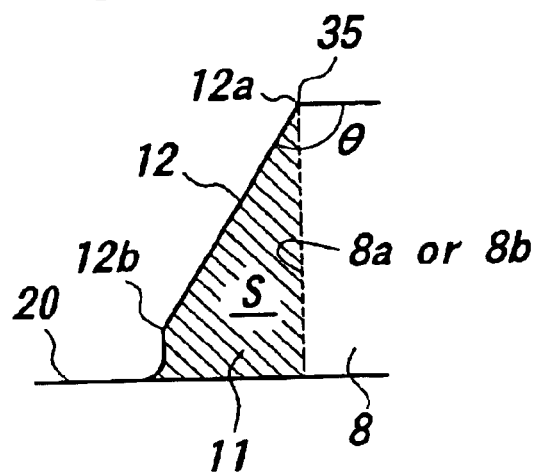
FIGS. 2a to 2c are section views taken along lines I—I, II—II and III—III of a pseudo-land portion shown in FIG. 1, respectively.

The term "cross sectional area of the pseudo-land portion" used herein means a cross sectional area S when the pseudo-land portion 11 is cut off at a plane including a widthwise direction 25 of the tire as shown in FIG. 2a, and the term "a given circumferential direction of the tire" used herein means either forward side or rear-ward side in the circumferential direction of the tire, more preferably a direction of successively contacting a portion of the tread portion 1 in the tire with the ground (a direction of an arrow 24 in FIG. 1).

Figure 2B:
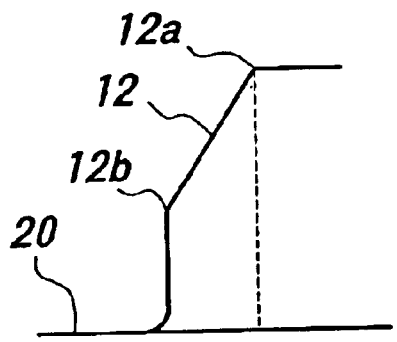
Figure 2C:
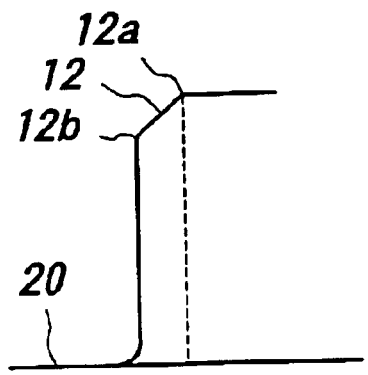

In FIGS. 2a-2c are shown cross sections when the pseudo-land portion 11 shown in FIG. 1 are cut off at lines I—I, II—II and III—III, respectively. Thus, according to the invention, it is preferable to form the pseudo-land portion 11 so as to gradually increase the cross sectional area S thereof toward a given circumferential direction 24 of the tire.

Figure 3A:
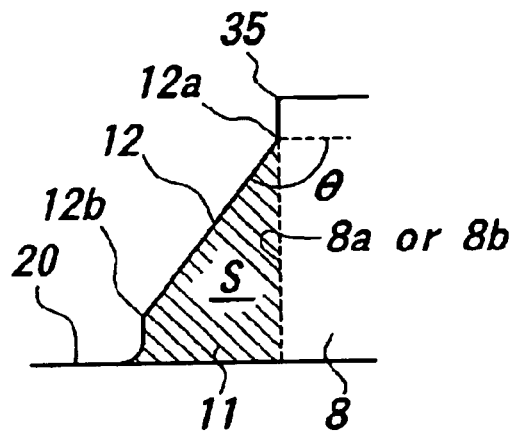
FIGS. 3a to 3c are section views similar to those of FIG. 2 in another pseudo-land portion having a shape different from that of FIG. 2, respectively.
Figure 3B:
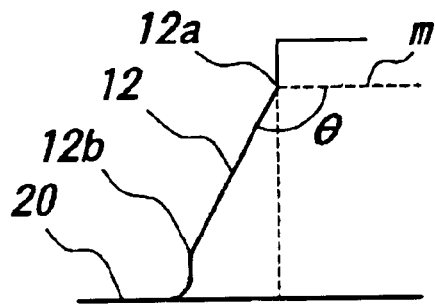
Figure 3C:
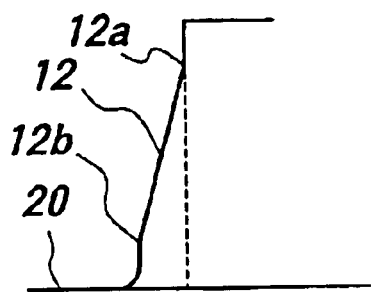
Figure 4A:
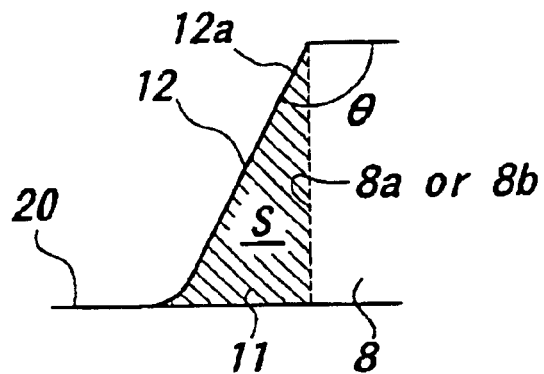
FIGS. 4a to 4c are section views similar to those of FIG. 2 in the other pseudo-land portion having a shape different from that of FIG. 2, respectively.
Figure 4B:
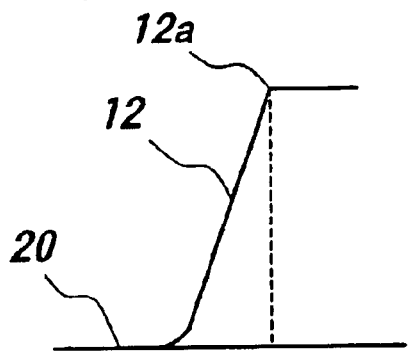
Figure 4C:
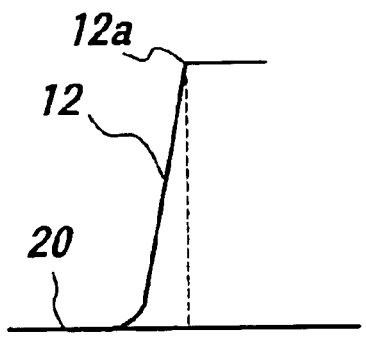
Figure 5A:
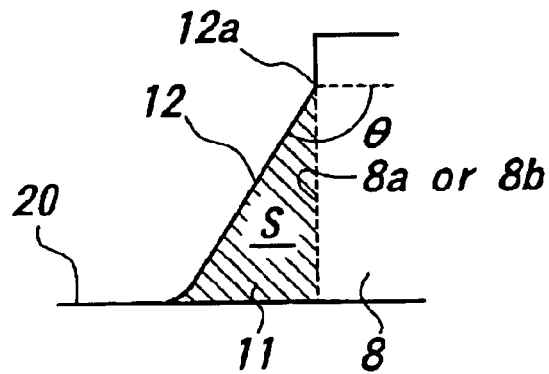
FIGS. 5a to 5c are section views similar to those of FIG. 2 in the other pseudo-land portion having a shape different from that of FIG. 2, respectively.
Figure 5B:
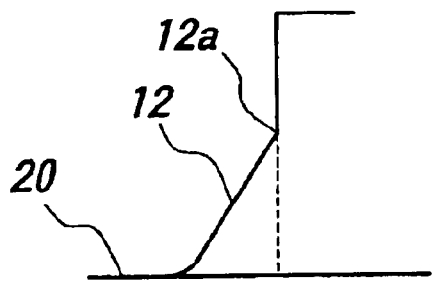
Figure 5C:
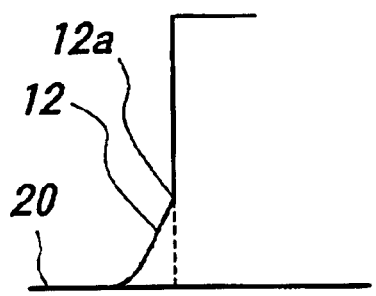

The sectional shape of the pseudo-land portion 11 may, for example, take shapes and the like as shown in FIGS. 3-5, and is considered to have various embodiments.

And also, when the pseudo-land portion 11 is arranged in the circumferential groove 3, 4 such that an end part 22 located at a larger side of the cross sectional area S, more concretely a position 23 of the end part 22 closest to the slant groove 7a, 7b opening to the circumferential groove 3, 4 comes close to the opening portion $7a_1$, $7b_1$ of the slant groove 7a, 7b to the circumferential groove 3, 4, water flowing in the circumferential groove 3, 4 just after the contact of the portion of the tire with the ground can be smoothly flowed into the slant groove 7a, 7b of different arranged angles.

Furthermore, when the pseudo-land portion 11 is arranged adjacent to a first groove wall 26a, 26b of the circumferential groove 3, 4 forming the pseudo-land portion located at a side not opened with the slant groove 7a, 7b, it is possible to ensure a straight-shaped groove portion 27 in the circumferential groove 3, 4 as shown by oblique lines in FIG. 1, whereby the drainage efficiency in the circumferential groove 3, 4 is enhanced.

In addition, by the decrease of the groove volume in the circumferential groove 3, 4 accompanied with the arrangement of the pseudo-land portion 11 in the circumferential groove 3, 4 can be restricted the excessive drainage amount in the forward direction of the tire to prevent the increase of water amount ahead in the forward direction, which advantageously acts to control the occurrence of hydroplaning phenomenon.

Moreover, in order to improve the steering stability on a dry road surface by reinforcing a rigidity of a rib-shaped land portion 8 as mentioned later, FIG. 1 shows a case that the pseudo-land portion 11 is jaggedly arranged on the side wall of the rib-shaped land portion 8 in accordance with an arranging interval of the opening position $7a_1$, $7b_1$ in the slant groove 7a, 7b and is fixed to the first groove wall 26a, 26b. If it is required to control shoulder wear, sipe or the like is arranged between the pseudo-land portion 11 and the first groove wall 26a, 26b to separate them from each other, whereby the rigidity in the center land portion may relatively be lowered.

And also, a part (position 23 in FIG. 1) of the pseudo-land portion 11 closest to the slant groove 7a, 7b opening to the circumferential groove 3, 4 forming the pseudo-land portion is preferable to have a height measured from a groove bottom 20 of the circumferential groove 3, 4 within a range of 10–60% of a maximum depth of the circumferential groove 3, 4. When the height is less than 10%, water almost flows toward the circumferential direction and the effect of flowing water into the slant groove 7a, 7b tends to become small, while when the height exceeds 60%, the flow in the circumferential direction is restricted and the drainage property in the forward direction becomes unstable and there is a fear of lowering a speed of limiting the occurrence of the hydroplaning phenomenon. By adopting such a construction, the flow ahead the circumferential direction before the contact of the tire with the ground and the flow to the slant groove 7a, 7b after the contact of the tire with the ground can simultaneously be established at a higher level.

Furthermore, when the pseudo-land portion 11 is rendered into a shape of protruding in the circumferential groove 3, 4 from the side of the first groove wall 26a, 26b as mentioned above, water flowing in the circumferential groove 3, 4 is forced to change into the flow of water into the slant groove 7a, 7b through the pseudo-land portion 11.

For this end, when it is required to more promote the smooth inflow of water flowing in the circumferential groove 3, 4 into the slant groove 7a, 7b, the surface of the pseudo-land portion 11 is preferable to be rendered into a slant surface 12 having a height gradually decreased toward the side of the slant groove 7a, 7b opening to the circumferential groove 3, 4 forming the pseudo-land portion.

The slant surface 12 of the pseudo-land portion 11 comprises a basic side 12a arranged opposite to and adjacent to the first groove wall 26a, 26b and an oblique side 12b opposite to the basic side 12a as shown in FIGS. 2a-2c and the like, but also may be formed so that it is continuously connected to the groove bottom 20 of the circumferential groove (for example, arc-shaped) to make a boundary line there-between or the above oblique side unapparent as shown in FIGS. 4a-4c and 5a-5c.

Figure 6A:
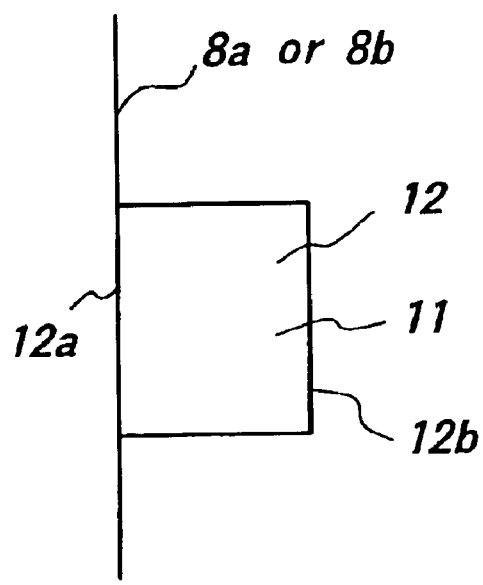
FIGS. 6a and 6b are schematically plan views of a slant surface of a pseudo-land portion 11 having a shape different from that of FIG. 1, respectively.
Figure 6B:
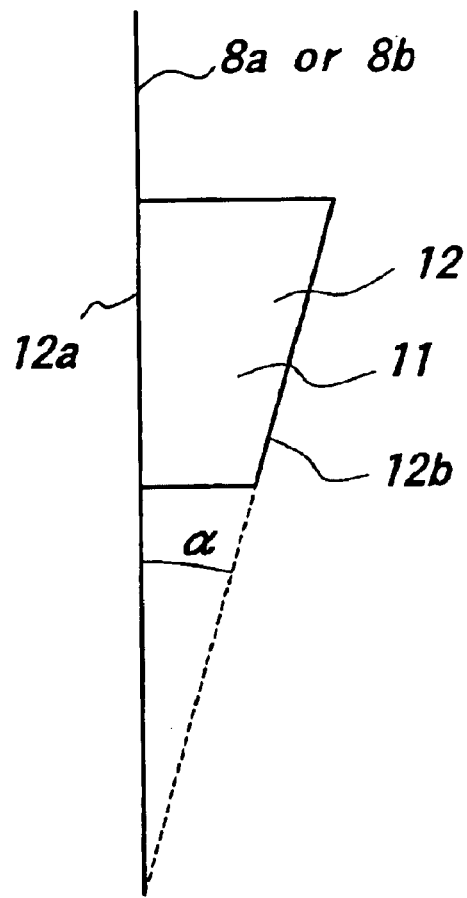

Moreover, the term "oblique side" used herein includes not only a case that the oblique side 12b inclines with respect to the basic side 12a in a plan view when the slant surface 12 is projected onto the ground contact face of the tire as shown in FIGS. 1 and 6b, but also a case that the oblique side 12b is in parallel to the basic side 12a in the above plan view but inclines with respect to the basic side 12a in a side view when the slant surface 12 is projected onto the equatorial plane 2 of the tire as shown in FIG. 6a, that is, a case that the oblique side 12b and the basic side 12a have a relation of skew position.

And also, the drainage can easily be conducted by locating the basic side 12a of the slant surface 12 at the ground contact face side of the tread portion 1 and locating oblique side 12b thereof at the side of the groove bottom 20 in the circumferential groove 3, 4. As the contact of the portion of the tire with the ground proceeds, water flowing in the circumferential groove 3, 4 easily changes through the slant surface 12 of the pseudo-land portion 11 and can be more smoothly flowed into the slant groove 7a, 7b.

As a result, the tread pattern can be made suitable for the drainage mechanism corresponding to the change of the flow phenomenon in the tread grooves 3, 4 and 7a, 7b with the lapse of time, whereby the efficient drainage can be conducted.

And also, it is favorable that the slant surface 12 is rendered into substantially a flat shape (FIGS. 2-5) or into substantially a curved shape from a viewpoint of performing the smooth drainage without disorder.

Moreover, when the slant surface 12 is rendered into substantially the curved shape, if the drainage property is thought to be important, the slant surface 12 is preferable to be formed such that a center of curvature thereof is located outward from the slant surface 12 in the radial direction of the tire, while if the ground contacting property and rigidity of the rib-shaped land portion 8 are thought to be important, the slant surface 12 is preferable to be formed such that a center of curvature thereof is located inward from the slant surface 12 in the radial direction of the tire.

Furthermore, when the slant surface 12 is projected onto a ground contact face of the tire, it is preferable to be formed in an approximately triangular shape (FIG. 1) or trapezoidal shape (FIG. 6b) for smoothly changing the flow of water from the circumferential groove 3, 4 to the slant groove 7a, 7b while maintaining the groove volume of the circumferential groove 3, 4. However, it is not restricted to only these shapes, and the flat shape of the slant surface 12 may be made rectangular as shown in FIG. 6a.

When the slant surface 12 is arranged so as to successively enter the oblique side 12b opposite to the basic side 12a into the ground contact region from a side near to the side groove wall 8a, 8b of the rib-shaped land portion 8 toward a side apart therefrom, water flowing in the circumferential groove 3, 4 is smoothly introduced into the slant grooves 7a, 7b.

When an angle $\alpha$ defined between the basic side 12a and the oblique side 12b in the slant surface 12 as projected onto the ground contact face of the tire is made within a range of not more than 20°, the change in a direction continuing from the first groove wall 26a, 26b of the circumferential groove 3, 4 to the groove wall of the slant groove 7a, 7b, particularly the change in a depth direction can be made smooth to more effectively control the disorder of water flow. Moreover, the angle $\alpha$ is more preferable to be within a range of 2–15°. That is, when the angle $\alpha$ is less than 2°, the effect of adjusting the flow toward the sideward direction tends to be lacking, while when it exceeds 15°, the drainage ability ahead the tire tends to be lacking.

When the directionality is given to the pseudo-land portion 11 by locating a position of an intersecting point between the basic side 12a and the oblique side 12b in the slant surface 12 at a lowest side of the slant surface 12 as viewed from a front face of the tire, the change of water flowing in the circumferential groove 3, 4 into the slant groove 7a, 7b can be made more smooth.

When the slant surface 12 is projected onto the ground contact face of the tire, it is preferable that the oblique side 12b is rendered into such a curved shape that a center of curvature is located outward in the widthwise direction of the tire in view of gradually increasing a tendency that water flows toward the sideward direction as water approaches the groove bottom 20.

Moreover, the basic side 12a of the slant surface 12 opposing to the first groove wall 26a, 26b of the circumferential groove 3, 4 is preferable to be substantially the same height position as a maximum height position 35 of the first groove wall 26a, 26b as shown in FIGS. 2 and 4. In particular, when the drainage property in the forward and backward directions of the tire through the circumferential groove 3, 4 is thought to be important, it is favorable that the groove volume of the circumferential groove 3, 4 is ensured as far as possible by arranging the basic side 12a inward from the maximum height position 35 of the first groove wall 26a, 26b in the radial direction of the tire as shown in FIGS. 3 and 5, or by making the cross angle $\alpha$ between the basic side 12a and the oblique side 12b small.

Further, when it is required to balancedly improve the drainage property and the steering stability, it is preferable that a pair of circumferential grooves 3, 4 are arranged in the tread portion 1, preferably the central region of the tread and the rib-shaped land portion 8 is defined and formed between the circumferential grooves 3, 4.

That is, when the pair of circumferential grooves 3, 4 are arranged in the tread portion 1, the occurrence of the hydroplaning phenomenon can sufficiently be controlled to obtain a good drainage property. And also, when the rib-shaped land portion 8 is defined and formed between the circumferential grooves 3, 4, the rigidity of the land portion can be made large to enhance a response at a minute steering angle, whereby the steering stability on a dry road surface can sufficiently be ensured.

Moreover, the circumferential groove 3, 4 is sufficient to be a shape extending along the circumferential direction of the tire. Therefore, it is not limited to the straight shape as shown in FIG. 1, and may take various shapes.

And also, when the rib-shaped land portion 8 is continuously formed in the circumferential direction of the tire without being divided by lateral groove or the like, the land portion can be smoothly rotated and contacted with the ground, so that it is particularly possible to reduce the noise. In addition, by rendering each of the circumferential grooves 3, 4 defining the rib-shaped land portion 8 into an independent groove is decreased a factor of disordering the water flow in each circumferential groove 3, 4, which is also advantageous in the drainage property.

Further, it is preferable that a center position in the width-wise direction of the rib-shaped land portion 8 substantially coincides with a center position of a pattern in a point that the tire to be mounted onto a vehicle can be used in either left and right wheels of the vehicle. Although FIG. 1 shows a case that the pattern center position coincides with the position 2 of the tire equator, the former position may be shifted from the latter position.

Furthermore, it is preferable that a cross angle ($\theta$) between the slant surface 12 and a ground contact face of the rib-shaped land portion 8 (see FIG. 2) or a phantom plane m arranged in parallel to the ground contact face (see FIG. 3) is within a range of 120–150° viewing at a cross section in the widthwise direction of the tire in order to balancedly satisfy both the keeping of the groove volume in the circumferential groove 3, 4 and the effect of adjusting the water flow toward the sideward direction of the tire.

It is preferable that a corner part 15 of the slant land portion 16a, 16b defined by the arrangement of the circumferential groove 3, 4, the slant groove 7a, 7b and/or the tread end and located at the side of the tire equator 2 is formed at an acute angle, and the corner part 15 is arranged at a position entering into the ground contact region after the pseudo-land portion 11 in order to make the inflow of water from the circumferential groove 3, 4 to the slant groove 7a, 7b more smooth. And also, it is preferable that the corner part 15 is arranged on the same circumference of the tire as an intersecting position between a cross section S of the pseudo-land portion 11 having a maximum cross sectional area and the oblique side 12b of the slant surface 12, or on an extension line of the oblique side 12b (FIG. 7) from the same reason as mentioned above. In addition, it is preferable that the corner part 15 is subjected to a chamfering, more preferably a chamfering for the formation of a smoothly curved shape in view of ensuring the keeping of the drainage volume in the forward direction of the tire and the rigidity of the block.

And also, when the corner part 15 is connected with the pseudo-land portion 11, the branch flowing of water flowing in the circumferential groove 3, 4 into the slant groove 7a, 7b can be conducted more positively and smoothly.

Moreover, as means for connecting between the pseudo-land portion 11 and the corner part 15, mention may be made of a case that the corner part 15 is directly connected to the pseudo-land portion 11 (FIG. 8) and a case that an inflow promoting wall is arranged between the corner part 15 and the pseudo-land portion 11.

The slant groove 7a, 7b is sufficient to be such a shape that it obliquely extends between the circumferential groove 3, 4 and the ground contact end 5, 6 of the tread with respect to the circumferential direction of the tire. For example, in order to improve the drainage property, it is preferable that as shown in FIG. 1, the slant groove 7a, 7b is arranged so as to make an angle of a groove portion 9a, 9b located in a central region of the tread with respect to the circumferential direction of the tire small and an angle of a groove portion 10a, 10b located at a side region of the tread large. However, both groove portions 9a and 10a, 9b and 10b may be arranged at the same angle. Moreover, it is preferable that the angle of the slant groove 7a, 7b is within a range of 5–50° in the groove portion 9a, 9b located in the central region of the tread and within a range of 60–85° in the groove portion 10a, 10b located in the side region of the tread.

In addition, the pair of the slant grooves 7a and 7b located on both sides of the tread center may be formed in an axial symmetry with respect to the tread center or may be formed so as to offset each other in the circumferential direction of the tire as shown in FIG. 1.

When the slant grooves 7a, 7b opening to the circumferential grooves 3, 4 are arranged so as to separate away from the circumferential grooves 3, 4 toward a given circumferential direction 24 of the tire, the drainage property toward the sideward direction of the tire just after the contact of the tire with the ground inclusive of the contacting with the ground can effectively be increased.

Moreover, in order to obtain a higher drainage property, it is more preferable that the slant grooves 7a, 7b each extending from the circumferential groove 3, 4 toward the ground contact end 5, 6 of the tread are arranged in such a direction that they successively enter into the ground contact face from the side of the circumferential groove 3, 4 toward the side of the ground contact end 5, 6 of the tread to thereby form a directional pattern in the tread portion 1.

Although the above is described with respect to only an embodiment of the invention, various modifications may be taken within a scope of the invention.

For example, as shown in FIG. 1, an additional groove 17 may be arranged to further divide the slant land portions 16a, 16b located between the slant grooves 7a–7a and 7b–7b into two block land portions 13a and 14a, 13b and 14b.

In this case, the same chamfering as mentioned above may be applied to a corner part 18 of the block land portion 13a, 13b located at the ground contact end side of the tread.

Further, it is possible that a slant surface similar to the slant surface 12 of the pseudo-land portion 11 is formed in a side edge part 19 of a block land portion 14a, 14b adjacent to the corner part 18.

Figure 8:
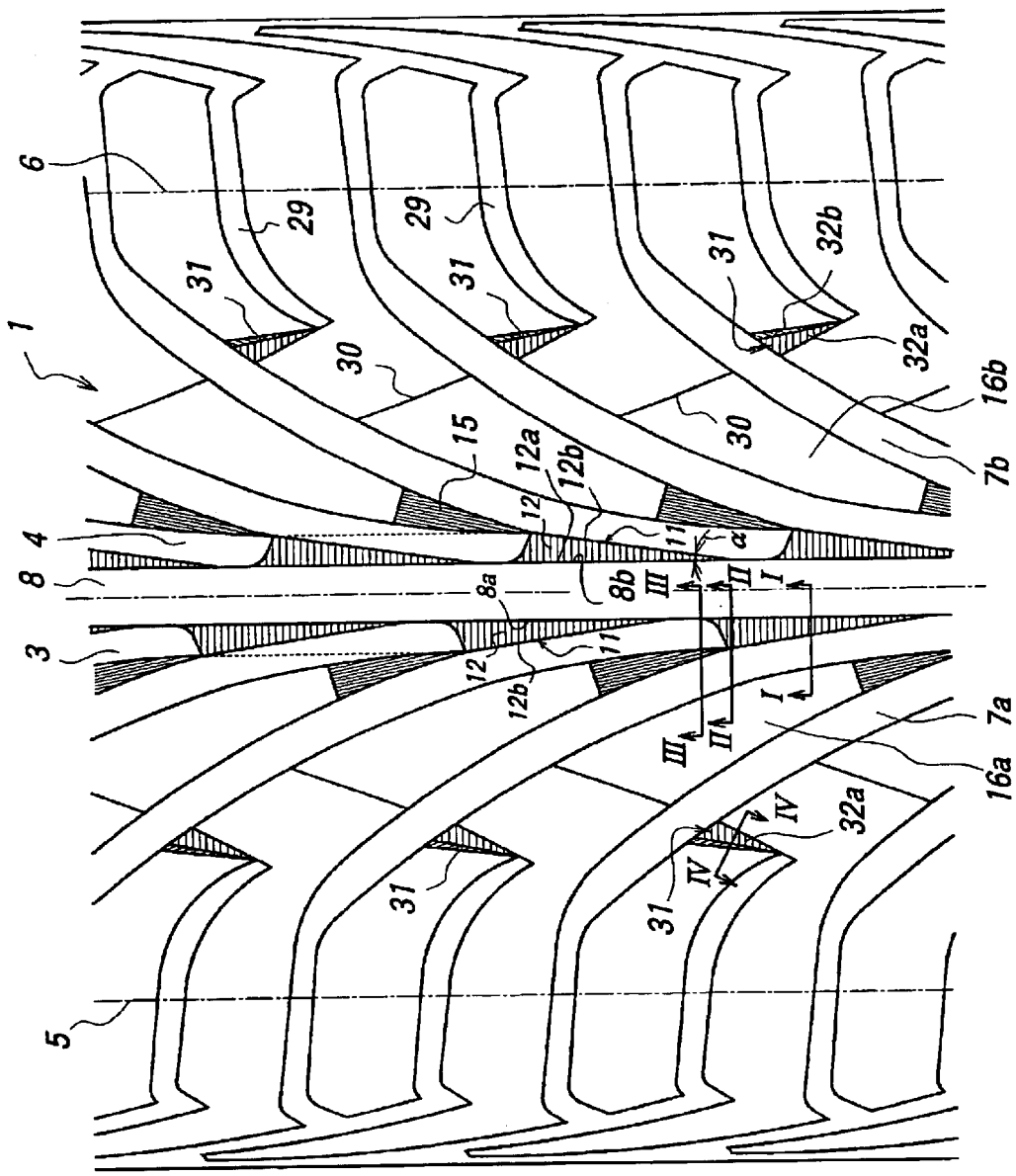
FIG. 8 is a diagrammatically partial developed view of a tread pattern in a tire of Example 3.

Furthermore, FIG. 8 shows a developed view of another tread pattern according to the invention. As shown in this figure, each of slant land portions 16a, 16b defined by slant grooves 7a and 7a, 7b and 7b formed at given intervals on the same circumference may be extended so as to gradually widen from an acute corner part 15 adjacent to the circumferential groove 3, 4 toward the side of the tread end and also a wide-width part of the slant land portion 16a, 16b can be bifurcated by a lateral sub-groove 29 extending substantially in parallel to the slant groove 7a, 7b across the ground contact end 5, 6 of the tread.

Figure 9A:
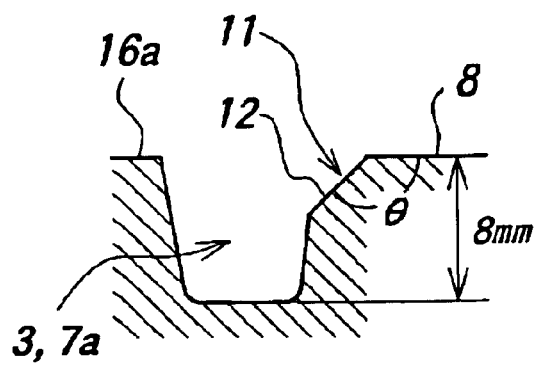
FIGS. 9a to 9c are section views taken along lines I—I, II—II and III—III of a pseudo-land portion shown in FIG. 8, respectively.
Figure 9B:
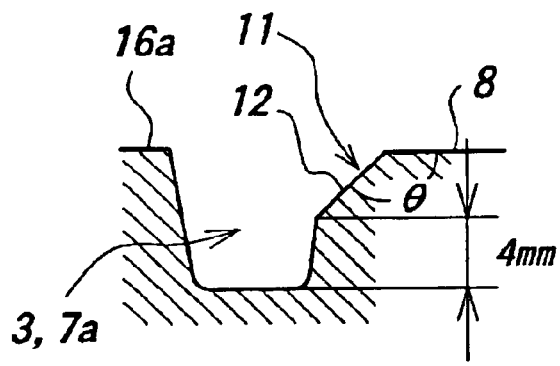
Figure 9C:
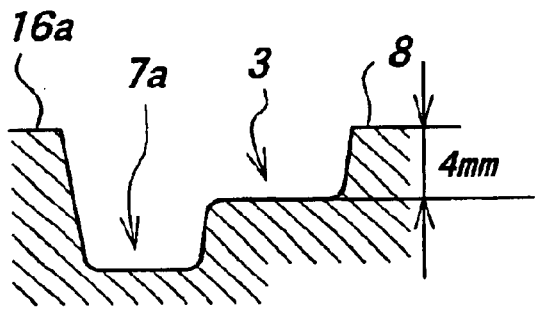

Moreover, FIGS. 9a–9c show cross sections taken along lines I—I, II—II and III—III of FIG. 8, respectively.

In the tread pattern of FIG. 8, as shown in FIG. 9c, the groove bottom of the circumferential groove 3, 4 is pushed out up to a half of a maximum depth thereof at an end position of the wide-width side in the pseudo-land portion 11. Such a pushed groove bottom can contribute to the smooth inflow of water flowing in the circumferential groove 3, 4 into the slant groove 7a, 7b and prevent the violent change of the groove volume at the end position of the pseudo-land portion 11 to control the disorder of the water flow. And also, the pushing amount of the groove bottom in the circumferential groove 3, 4 in FIG. 1 is constructed so as to gradually degrease along the rib-shaped land portion 8 and become zero in a zone ranging from the line III—III of FIG. 8 to the adjoining pseudo-land portion 11, but such a construction may properly be modified, if necessary.

In addition, a sipe 30 extending straightforward and opening to the two slant grooves 7a and 7a, 7b and 7b may be formed in each slant land portion 16a, 16b at substantially a middle position between the circumferential groove 3, 4 and the ground contact end 5, 6 of the tread, and also a conducting groove 31 extending inward from a position corresponding to an inner end of the lateral sub-groove 29 in the widthwise direction of the tread and substantially in parallel to the sipe 30 may be formed between the sipe 30 and the ground contact end 5, 6 of the tread, whereby the slant land portion 16a, 16b is divided into blocks to enhance the ground contacting property.

Figure 10:
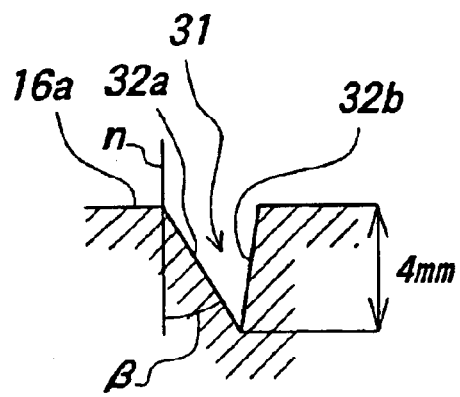
FIG. 10 is a section view taken along a line IV—IV of FIG. 8.

The conducting groove 31 has an opening width gradually enlarging from the lateral sub-groove 29 to the side of the slant groove 7a, 7b and its cross sectional shape is substantially V-shaped as a whole as seen from FIG. 10 showing a section taken along line IV—IV of FIG. 8 for gathering water on the slant land portion 16a, 16b, particularly on a portion thereof located more inward from the conducting groove 31 in the widthwise direction. Moreover, a widthwise inner groove wall 32a of the conducting groove 31 has a large cross angle β with respect to a normal line n drawn onto the slant land portion 16a, 16b as compared with the other groove wall. 32b, so that water existing on the surface of the slant land portion 16a, 16b can be smoothly introduced into the slant groove 7a, 7b while controlling the separation of water flow from the groove wall 32a of the conducting groove 31.

Such a conducting groove 31 functions to gather water on the slant land portion 16a, 16b, particularly on the portion thereof located inward from the conducting groove 31 in the widthwise direction and smoothly inflow into the slant groove 7a, 7b during the running of the tire under loading.

Figure 11:
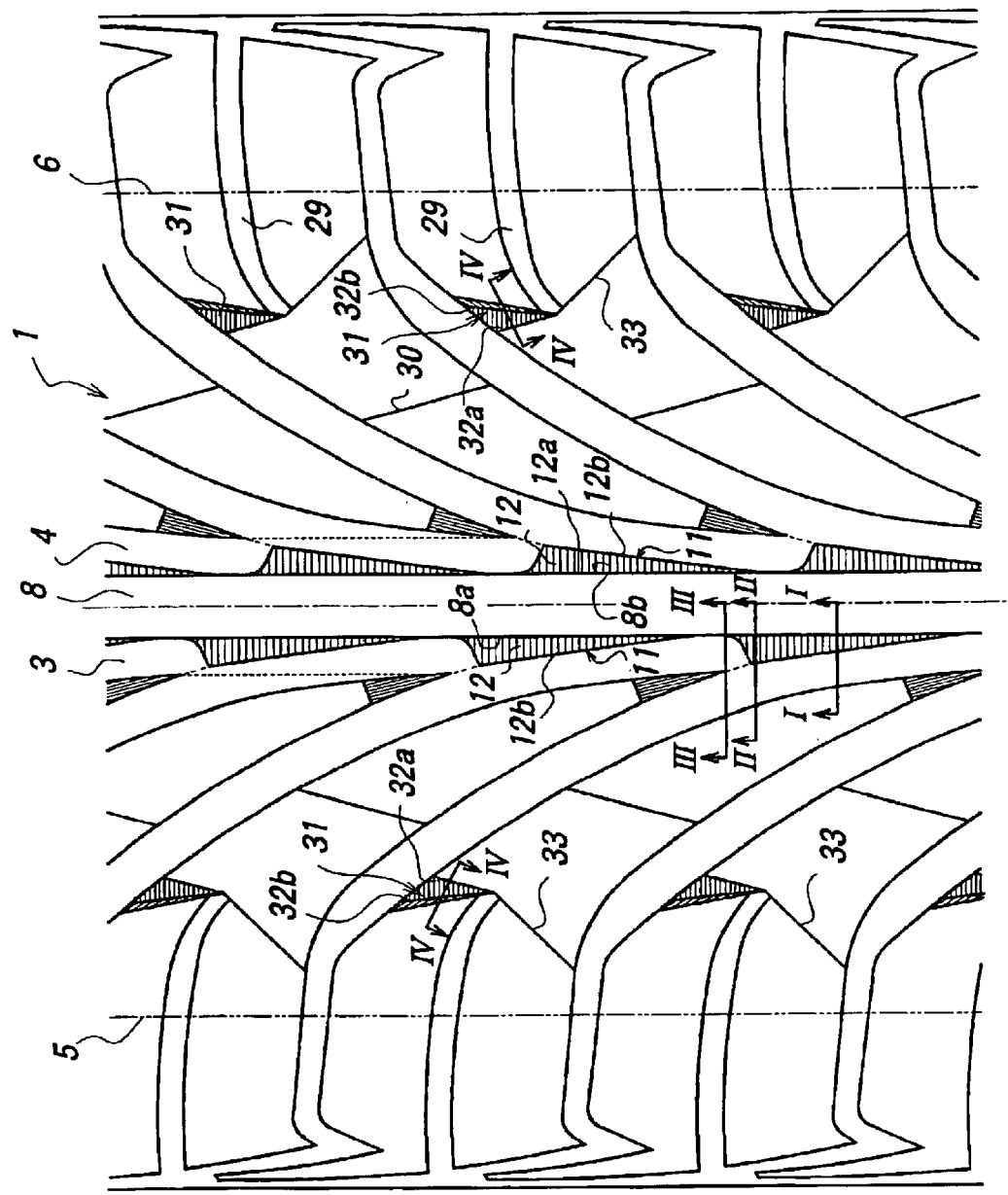
FIG. 11 is a diagrammatically partial developed view of a tread pattern in a tire of Example 4.

FIG. 11 is a developed view of a tread pattern in the other embodiment of the invention. In this case, a cross angle of the groove wall 32b located outward in the widthwise direction of the conducting groove 31 with respect to the normal line n of the land portion is made larger than that of the other groove wall 32a and a sipe 33 extending from the inner end of the lateral sub-groove 29 in the widthwise direction of the tread toward a reverse side with respect to the conducting groove 31 and arriving at the other slant groove is straightly formed outward from the inner end of the lateral sub-groove 29 in the widthwise direction of the tread.

Figure 12:
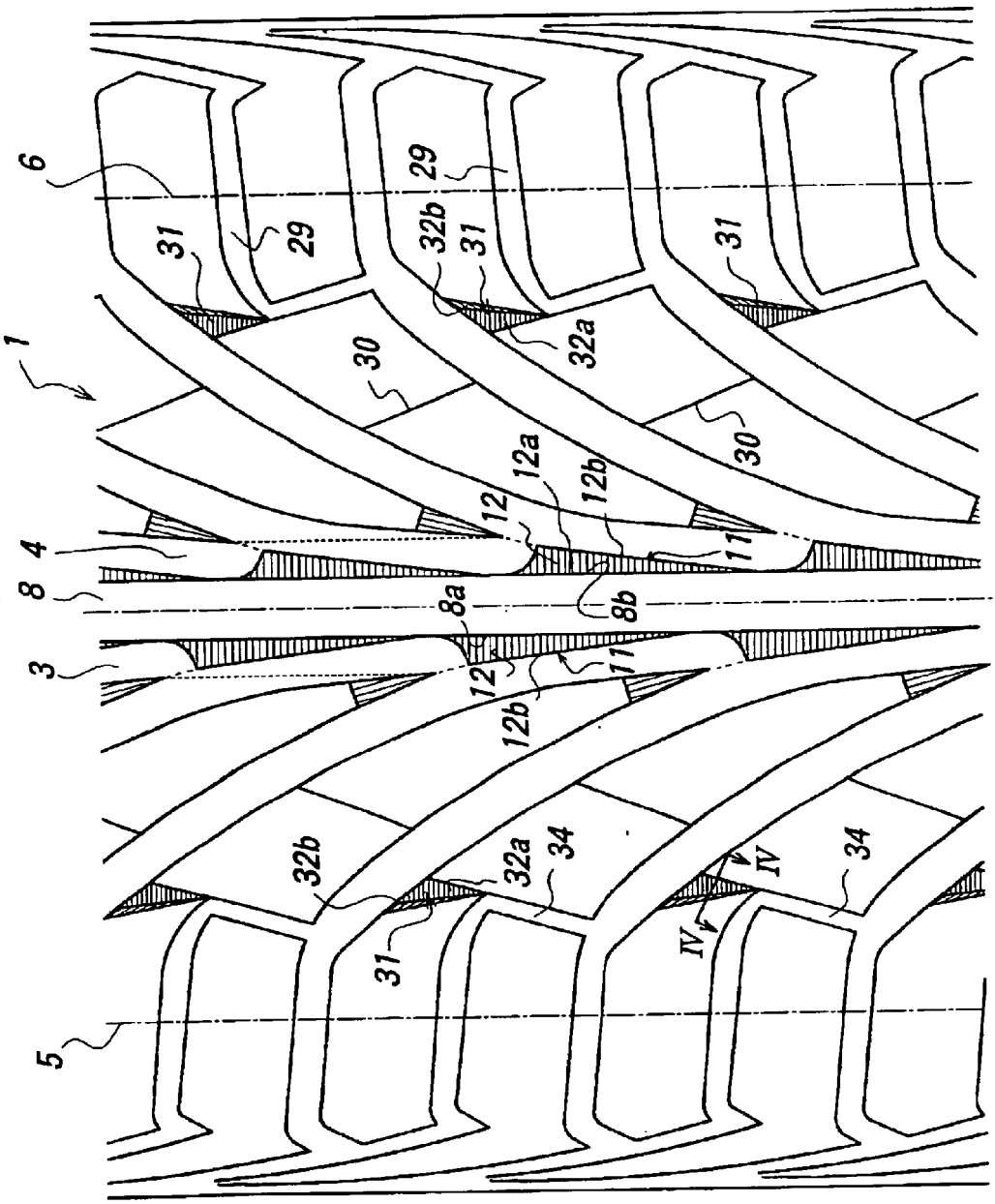
FIG. 12 is a diagrammatically partial developed view of a tread pattern in a tire of Example 5.

FIG. 12 shows a further embodiment of the invention. In this case, a connecting groove 34 extending from the inner end of the lateral sub-groove 29 in the widthwise direction of the tread toward a reverse side with respect to the conducting groove 31 and arriving at the other slant groove is formed in a direction substantially perpendicular to the other slant groove.

Even in these embodiments, the basic construction is the same as shown in FIG. 1, so that the tread patterns shown in FIG. 11 and 12 can also develop the action and effect as mentioned in connection with FIG. 1.

The pneumatic tires according to the invention are prepared and the properties thereof are evaluated as follows.

EXAMPLE 1

A tire of Example 1 has a tread pattern shown in FIG. 1 and a tire size of PSR205/55R16 (tread width: 170 mm) and dimensions of circumferential grooves 3, 4, slant grooves 7a, 7b, pseudo-land portion 11 and the like as shown in Table 1. Moreover, the tire structure other than the tread portion is substantially the same as in the conventional pneumatic tire for passenger car.

TABLE 1

|  | Width of groove (mm) | Angle of groove[*1] (°) | Depth of groove (mm) |
| --- | --- | --- | --- |
| Circumferential groove 3, 4 | 10 | 0 | 8 |
| Groove portion 9a, 9b of slant groove | 6~9 | 35 | 8 |
| Groove portion 10a, 10b of slant groove | 5 | 70 | 6~1 |
| Additional groove 17 | 3 | 10 | 6 |
| Rib-shaped land portion 8 | Width of land portion: 16 mm, Height of land portion: 8 mm | | |
| Pseude-land portion 11 | Dimension of each side in slant surface 12: 55 mm × 50 mm × 7 mm, Height of land portion: 8~1.6 mm, θ = 130°, α = 5° | | |
| Corner part 15, 18 of land portion 13a, 13b | Length of chamfering: 15 mm | | |
| Side edge part 19 of land portion 14a, 14b | Dimension of each side in slant surface of side edge part 19: 40 mm × 35 mm × 7 mm, Chamfered angle and height of land portion: the same as those in slant surface 12 of pseude-land portion 11 | | |

(Note) [*1]Angle of groove is an angle measured with respect to equatorial plane of tire and an angle of groove extending from the bottom up as groove extends from equator side of tire toward end side of tread when viewing tread pattern shown in FIG. 1.

EXAMPLE 2

Figure 7:
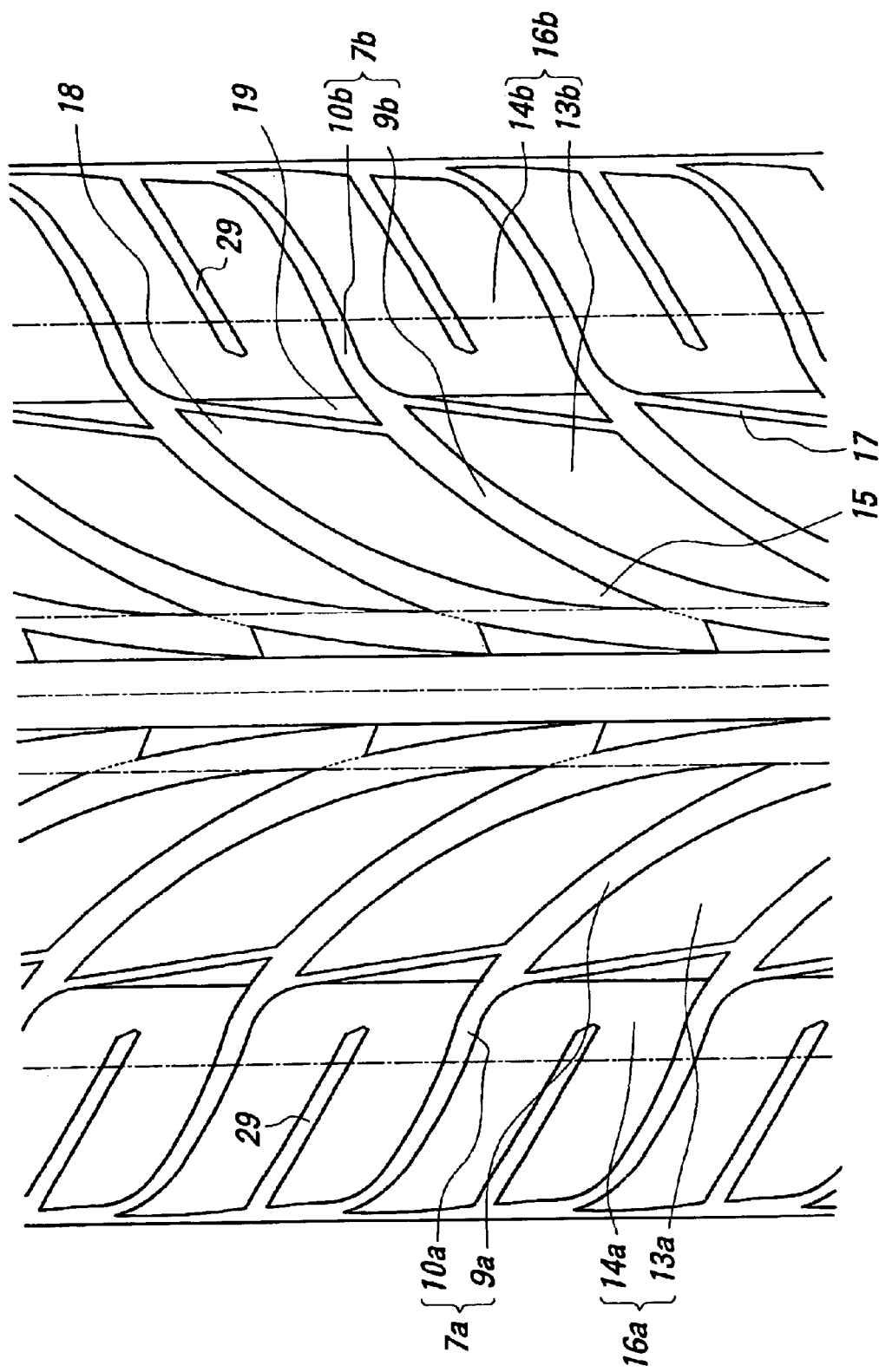
FIG. 7 is a diagrammatically partial developed view of a tread pattern in a tire of Example 2.

A tire of Example 2 is substantially the same as in Example 1 except that it has a tread pattern shown in FIG. 7 and dimensions of circumferential grooves 3, 4, slant grooves 7a, 7b, pseudo-land portion 11 and the like as shown in Table 2.

TABLE 2

|  | Width of groove (mm) | Angle of groove[*1] (°) | Depth of groove (mm) |
| --- | --- | --- | --- |
| Circumferential groove 3, 4 | 10 | 0 | 8 |
| Groove portion 9a, 9b of slant groove | 8~7 | 35~50 | 8 |
| Groove portion 10a, 10b of slant groove | 5 | 70 | 6~1 |
| Additional groove 17 | 3 | 10 | 6 |
| Lateral sub groove 29 | 4 | 70 | 5~1 |
| Rib-shaped land portion 8 | Width of land portion: 16 mm, Height of land portion: 8 mm | | |
| Pseude-land portion 11 | Dimension of each side in slant surface 12: 55 mm × 50 mm × 7 mm, Height of land portion: 8~1.6 mm, θ = 130°, α = 5° | | |
| Corner part 15, 18 of land portion 13a, 13b | Length of chamfering: 15 mm | | |
| Side edge part 19 of land portion 14a, 14b | Dimension of each side in slant surface of side edge part 19: 40 mm × 35 mm × 7 mm, Chamfered angle and height of land portion: the same as those in slant surface 12 of pseude-land portion 11 | | |

(Note) [*1]Angle of groove is an angle measured with respect to equatorial plane of tire and an angle of groove extending from the bottom up as groove extends from equator side of tire toward end side of tread when viewing tread pattern shown in FIG. 7.

EXAMPLE 3

A tire of Example 3 is substantially the same as in Example 1 except that it has a tread pattern shown in FIG. 8 and dimensions of circumferential grooves 3, 4, slant grooves 7a, 7b, pseudo-land portion 11 and the like as shown in Table 3.

TABLE 3

|  | Width of groove (mm) | Angle of groove[*1] (°) | Depth of groove (mm) |
| --- | --- | --- | --- |
| Circumferential groove 3, 4 | 8 | 0 | 8 |
| Slant groove 7a, 7b | 9~6~5 | 20~40~85 | 8 |
| Lateral sub groove 29 | 5 | 85 | 6~1 |
| Conducting groove 31 | 5~1 | −10~−30 | 4 |
| Sipe 30 | 0.7 | −20 | 4 |
| Rib-shaped land portion 8 | Width of land portion: 16 mm, Height of land portion: 8 mm | | |

TABLE 3-continued

|  | Width of groove (mm) | Angle of groove*1 (°) | Depth of groove (mm) |
|---|---|---|---|
| Pseude-land portion 11 | Dimension of each side in slant surface 12: 45 mm × 40 mm × 6 mm, Height of land portion: 8~4 mm, θ = 135°, α = 8° | | |
| Corner part 15 of land portion 16a, 16b | Length of chamfering: 20 mm | | |

(Note) *1Angle of groove is an angle measured with respect to equatorial plane of tire and a positive (+) value thereof means an angle of groove extending from bottom to top as groove extends from equator side of tire toward end side of tread and a negative (−) value thereof means an angle of groove extending from top to bottom to the contrary shown in FIG. 8.

EXAMPLE 4

A tire of Example 4 is substantially the same as in Example 1 except that it has a tread pattern shown in FIG. 11 and dimensions of circumferential grooves 3, 4, slant grooves 7a, 7b, pseudo-land portion 11 and the like as shown in Table 4.

TABLE 4

|  | Width of groove (mm) | Angle of groove*1 (°) | Depth of groove (mm) |
|---|---|---|---|
| Circumferential groove 3, 4 | 8 | 0 | 8 |
| Slant groove 7a, 7b | 9~6~5 | 20~40~85 | 8 |
| Lateral sub groove 29 | 5 | 85 | 6~1 |
| Conducting groove 31 | 5~1 | −15~15 | 4 |
| Sipe 30 | 0.7 | −20 | 4 |
| Sipe 33 | 0.7 | −45 | 4 |
| Rib-shaped land portion 8 | Width of land portion: 16 mm, Height of land portion: 8 mm | | |
| Pseude-land portion 11 | Dimension of each side in slant surface 12: 45 mm × 40 mm × 6 mm, Height of land portion: 8~4 mm, θ = 135°, α = 8° | | |
| Corner part 15 of land portion 16a, 16b | Length of chamfering: 20 mm | | |

(Note) *1Angle of groove is an angle measured with respect to equatorial plane of tire and a positive (+) value thereof means an angle of groove extending from bottom to top as groove extends from equator side of tire toward end side of tread and a negative (−) value thereof means an angle of groove extending from top to bottom to the contrary shown in FIG. 11.

EXAMPLE 5

A tire of Example 5 is substantially the same as in Example 1 except that it has a tread pattern shown in FIG. 12 and dimensions of circumferential grooves 3, 4, slant grooves 7a, 7b, pseudo-land portion 11 and the like as shown in Table 5.

TABLE 5

|  | Width of groove (mm) | Angle of groove*1 (°) | Depth of groove (mm) |
|---|---|---|---|
| Circumferential groove 3, 4 | 8 | 0 | 8 |
| Slant groove 7a, 7b | 9~6~5 | 20~40~85 | 8 |
| Lateral sub groove 29 | 5 | 85 | 6~1 |
| Conducting groove 31 | 5~1 | −10~−30 | 4 |
| Sipe 30 | 0.7 | −20 | 4 |
| Connecting groove 34 | 3 | 15 | 6 |
| Rib-shaped land portion 8 | Width of land portion: 16 mm, Height of land portion: 8 mm | | |

TABLE 5-continued

|  | Width of groove (mm) | Angle of groove*1 (°) | Depth of groove (mm) |
|---|---|---|---|
| Pseude-land portion 11 | Dimension of each side in slant surface 12: 45 mm × 40 mm × 6 mm, Height of land portion: 8~4 mm, θ = 135°, α = 8° | | |
| Corner part 15 of land portion 16a, 16b | Length of chamfering: 20 mm | | |

(Note) *1Angle of groove is an angle measured with respect to equatorial plane of tire and a positive (+) value thereof means an angle of groove extending from bottom to top as groove extends from equator side of tire toward end side of tread and a negative (−) value thereof means an angle of groove extending from top to bottom to the contrary shown in FIG. 12.

Conventional Example

Figure 13:
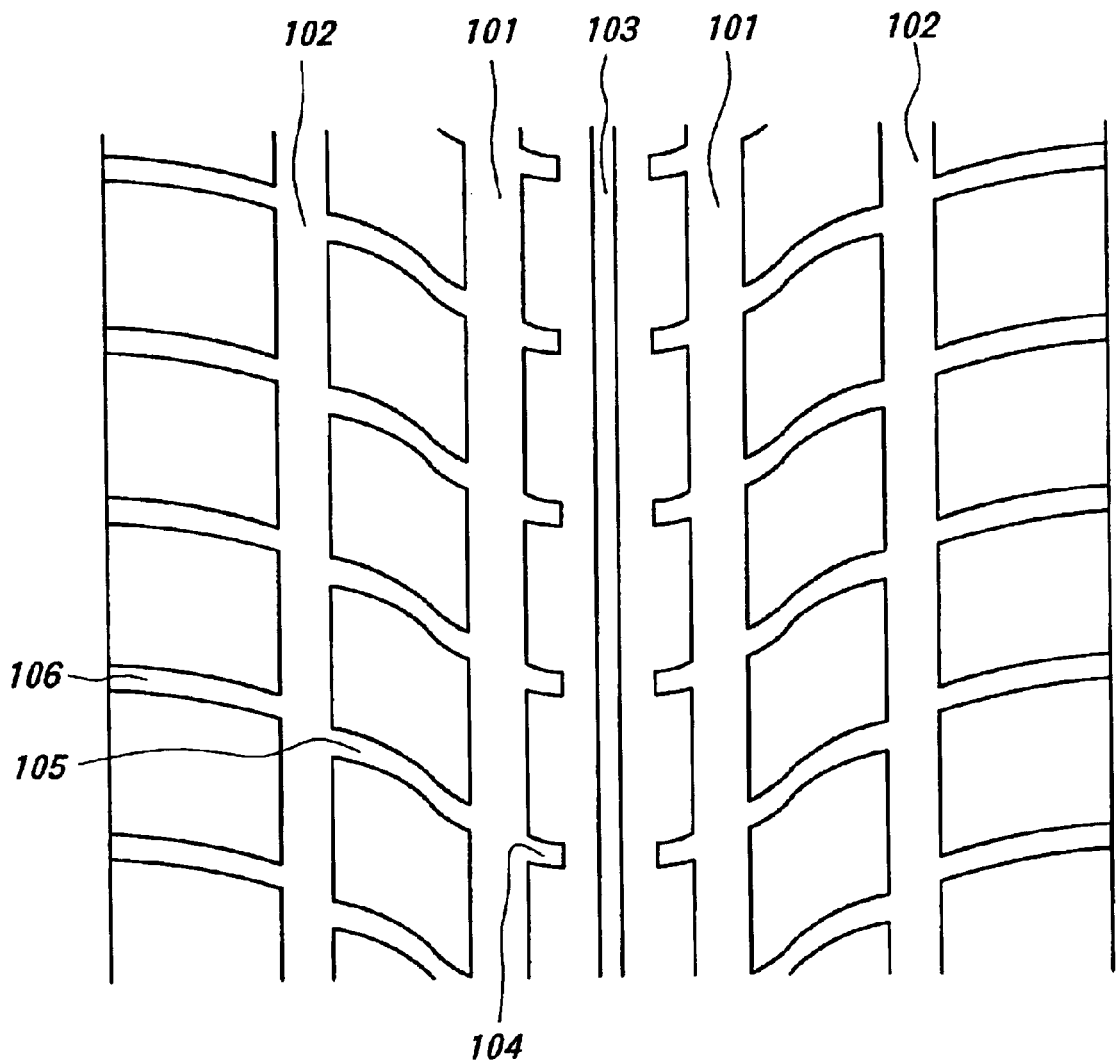
FIG. 13 is a diagrammatically partial developed view of a tread pattern in the conventional pneumatic tire.

For the comparison, there is provided a conventional tire having a general block pattern shown in FIG. 13 and the properties thereof are evaluated likewise the examples. Moreover, dimensions of circumferential grooves 101–103, slant grooves 104–106 and the like constituting the block pattern of FIG. 13 are shown in Table 6.

TABLE 6

|  | Width of groove (mm) | Angle of groove (°) | Depth of groove (mm) |
|---|---|---|---|
| Circumferential groove 101 | 8 | 0 | 8 |
| Circumferential groove 102 | 7 | 0 | 8 |
| Circumferential groove 103 | 3 | 0 | 8 |
| Slant groove 104 | 4 | 80 | 6.5 |
| Slant groove 105 | 4.5~5.0 | 50~70 | 6.5 |
| Slant groove 106 | 5 | 75 | 6.5 |

(Note)*1Angle of groove is an angle measured with respect to equatorial plane of tire and an angle of groove extending from the bottom up as groove extends from equator side of tire toward end side of tread when viewing tread pattern shown in FIG. 13.

(Test Method)

Each of the tires is mounted onto a recommended rim defined by JATMA and the tests for evaluating the drainage property on wet road surface, the steering stability on dry road surface and the pattern noise are carried out under conditions that an internal pressure of the tire is 230 kPa and a load applied to the tire is a load corresponding to a state of ridding two crewmen on the vehicle.

The drainage property on the wet road surface is evaluated by both a drainage property during the straight running and a drainage property during the cornering.

The drainage property during the straight running is evaluated by running on a wet road surface having a water depth of 5 mm and increasing a speed stepwise to measure a speed generating a hydro-planing phenomenon.

The drainage property during the cornering is evaluated by running on a wet cornering road surface having a water depth of 5 mm and a radius of 80 m and increasing a speed stepwise to measure a speed generating a hydroplaning phenomenon.

The steering stability on the dry road surface is evaluated by a test driver's feeling when the vehicle is run on a circuit course of a dry road surface state by various sport-running modes.

The pattern noise is evaluated by a test driver's feeling on an indoor sound when the vehicle is run on a smooth road surface and then run by inertia from 100 km/h.

The evaluation results are shown in Table 7. Moreover, each numerical value in Table 7 is represented by an index on the basis that Conventional Example is 100, in which the larger the numerical value, the better the drainage properties during the straight running and the cornering, the steering stability on the dry road surface and the pattern noise.

TABLE 7

|  | Conventional Example | Example 1 | Example 2 | Example 3 | Example 4 | Example 5 |
|---|---|---|---|---|---|---|
| Drainage property on wet road surface[1] | 100 | 120 | 125 | 120 | 120 | 120 |
| Drainage property on wet road surface[2] | 100 | 115 | 120 | 115 | 115 | 120 |
| Steering stability on dry road surface | 100 | 110 | 105 | 110 | 110 | 105 |
| Pattern noise | 100 | 105 | 100 | 110 | 110 | 110 |

[1]straight running,
[2]cornering

As seen from the results of Table 7, all tires of Examples 1–5 are excellent in the drainage property on the wet road surface and the steering stability on the dry road surface as compared with the tire of Conventional Example, and are equal to or more than a level of the pattern noise in the tire of Conventional Example.

INDUSTRIAL APPLICABILITY

According to the invention, it is possible to provide pneumatic tires, particularly high-performance tires capable of effectively enhancing the drainage property without sacrificing the other tire properties such as pattern noise and the like.

What is claimed is:

1. A pneumatic tire comprising:

a tread portion provided with at least one circumferential groove extending along a circumferential direction of the tire;

a plurality of slant grooves, each having a leading groove wall and a trailing groove wall, each opening to the circumferential groove and obliquely extending from such an opening position toward a ground contact end of a tread thereby defining blocks; and a pseudo-land portion formed in the circumferential groove so as to promote a smooth inflow of water flowing from the circumferential groove into a first slant groove of the plurality of slant grooves, wherein:

said pseudo-land portion comprises a slant face on a ground contact side so that said slant face does not contact a ground surface and faces the opening of the first slant groove;

the opening of the first slant groove is between the slant face and the leading wall of the first slant groove;

said opening position of said first slant groove is located on a side of the circumferential groove opposite to said pseudo-land portion formed on another side of said circumferential groove;

the pseudo-land portion is arranged in the circumferential groove so as to provide an end part at a larger side of the cross sectional area of the pseudo-land portion close to the portion of the first slant groove opened to the circumferential groove;

a groove shape, defined by the leading and trailing walls of the first slant groove as it extends toward the circumferential groove, is extended axially inward by a second shape defined by an axially outer edge of the pseudo-land portion and the leading wall of the first slant groove; and the blocks defined by the slant grooves do not extend axially inward of the end part of the pseudo land portion.

2. A pneumatic tire according to claim 1, wherein the pseudo-land portion is formed such that a cross sectional area thereof is gradually increased toward a given circumferential direction of the tire.

3. A pneumatic tire according to claim 1, wherein the pseudo-land portion is arranged adjacent to a first groove wall of the circumferential groove not opened to the slant groove.

4. A pneumatic tire according to claim 3, wherein the pseudo-land portion is fixed to the first groove wall.

5. A pneumatic tire according to claim 3, wherein the pseudo-land portion is arranged separately from the first groove wall.

6. A pneumatic tire according to claim 1, wherein the pseudo-land portion has such a part closest to the slant groove opening to the circumferential groove that a height measured from a groove bottom of the circumferential groove is within a range of 10–60% of a maximum depth of the circumferential groove.

7. A pneumatic tire according to claim 1, wherein the slant surface of the pseudo-land portion has a height that is gradually decreased toward the side of the slant groove opening to the circumferential groove.

8. A pneumatic tire according to claim 7, wherein the slant surface is substantially a flat shape.

9. A pneumatic tire according to claim 7, wherein the slant surface is substantially a curved shape.

10. A pneumatic tire according to claim 9, wherein a center of curvature in the slant surface is located outward from the slant surface in a radial direction of the tire.

11. A pneumatic tire according to claim 9, wherein a center of curvature in the slant surface is located inward from the slant surface in the radial direction of the tire.

12. A pneumatic tire according to claim 7, wherein when the slant surface of the pseudo-land portion is projected onto a ground contact face of the tire, its shape is approximately triangular or trapezoidal.

13. A pneumatic tire according to claim 7, wherein an oblique side opposite to a basic side in the slant surface successively enters in the ground contact face from a side near to a side wall of a rib-shaped land portion toward a side apart therefrom.

14. A pneumatic tire according to claim 7, wherein when a basic side and an oblique side are projected into the ground contact face of the tire, the slant surface is isosceles triangular wherein their length are substantially equal to each other and an angle (α) therebetween is within a range of not more than 20°.

15. A pneumatic tire according to claim 7, wherein a position of an intersecting point between a basic side and an oblique side is arranged at a lowest side of the slant surface viewing the tire from a front face.

16. A pneumatic tire according to claim 7, wherein a shape of an oblique side of the slant surface projected onto the ground contact face of the tire is a curved lone in which a center of curvature is located outward in a widthwise direction of the tire.

17. A pneumatic tire according to claim 7, wherein a basic side of the slant surface is substantially the same height position as a maximum height position of a first groove wall.

18. A pneumatic tire according to claim 7, wherein a basic side of the slant surface is located inward from the maximum height position of a first groove wall in the radial direction of the tire.

19. A pneumatic tire according to claim 1, wherein a pair of circumferential grooves are arranged in the tread portion to form a rib-shaped land portion between these circumferential grooves.

20. A pneumatic tire according to claim 19, wherein the rib-shaped land portion is continuously arranged in the circumferential direction of the tire.

21. A pneumatic tire according to claim 19, wherein the rib-shaped land portion has a center position in the widthwise direction substantially coincident with a pattern center position.

22. A pneumatic tire according to claim 19, wherein the rib-shaped land portion has a cross angle (Θ) between the slant surface and a ground contact face of the rib-shaped land portion or a phantom plane arranged in parallel to such a ground contact face within a range of 120–150° viewing at a section in the widthwise direction of the tire.

23. A pneumatic tire according to claim 1, wherein a corner part of first block of the blocks defined by the slant grooves is formed at an acute angle and arranged at a position entering in the ground contact region on the heels of the pseudo-land portion.

24. A pneumatic tire according to claim 23, wherein the corner part is arranged on the same circumference of the tire as an intersecting point between a section of the pseudo-land portion having a maximum sectional area and the oblique side of the slant surface or on an extension line of the oblique side.

25. A pneumatic tire according to claim 23, wherein the corner part is subjected to a chamfering.

26. A pneumatic tire according to claim 25, wherein the corner part is subjected to a chamfering forming a smoothly curved shape.

27. A pneumatic tire according to claim 23, wherein the corner part is connected with the pseudo-land portion.

28. A pneumatic tire according to claim 1, wherein all of the slant grooves each opening to each of a pair of circumferential grooves and extending toward the respective ground contact end of the tread are arranged in a direction of successively entering in the ground contact face from the side of the circumferential groove toward the side of the ground contact end to thereby form a directional pattern in the tread portion.

29. A pneumatic tire according to claim 1, wherein:
a border of the circumferential groove is defined by an imaginary circumferential line joining tips of corner portions of axially innermost blocks relative to an equatorial plane of said tire.

30. A pneumatic tire comprising:
a tread portion provided with at least one circumferential groove extending along a circumferential direction of the tire;
a plurality of slant grooves, each having a leading groove wall and a trailing groove wall, each opening to the circumferential groove and obliquely extending from such an opening position toward a ground contact end of a tread thereby defining blocks; and
a pseudo-land portion formed in the circumferential groove so as to promote a smooth inflow of water flowing from the circumferential groove into a first slant groove of the plurality of slant grooves, wherein:
said pseudo-land portion comprises a slant face on a ground contact side so that said slant face does not contact a ground surface and faces the opening of the first slant groove;
the opening of the first slant groove is between the slant face and the leading wall of the first slant groove;
the pseudo-land portion is arranged adjacent to a first groove wall of the circumferential groove not opened to the slant groove; and
the pseudo-land portion is arranged in the circumferential groove so as to provide an end part at a larger side of the cross sectional area of the pseudo-land portion close to the portion of the first slant groove opened to the circumferential groove;
a groove shape, defined by the leading and trailing walls of the first slant groove as it extends toward the circumferential groove, is extended axially inward by a second shape defined by an axially outer edge of the pseudo-land portion and the leading wall of the first slant groove; and
the blocks defined by the slant grooves do not extend axially inward of the end part of the pseudo land portion.

31. A pneumatic tire according to claim 30, wherein the pseudo-land portion is formed such that a cross sectional area thereof is gradually increased toward a given circumferential direction of the tire.

32. A pneumatic tire according to claim 30, wherein:
a border of the circumferential groove is defined by an imaginary circumferential line joining tips of corner portions of axially innermost blocks relative to an equatorial plane of said tire.

33. A pneumatic tire comprising:
a tread portion provided with at least one circumferential groove extending along a circumferential direction of the tire;
a plurality of slant grooves, each having a leading groove wall and a trailing groove wall, each opening to the circumferential groove and obliquely extending from such an opening position toward a ground contact end of a tread thereby defining blocks; and
a pseudo-land portion formed in the circumferential groove so as to promote a smooth inflow of water flowing from the circumferential groove into a first slant groove of the plurality of slant grooves, wherein:
said pseudo-land portion comprises a slant face on a ground contact side so that said slant face does not contact a ground surface and faces the opening of the first slant groove;
the opening of the first slant groove is between the slant face and the leading wall of the first slant groove;

said opening position of said first slant groove is located on a side of the circumferential groove opposite to said pseudo-land portion formed on another side of said circumferential groove;

the pseudo-land portion is arranged in the circumferential groove so as to provide an end part at a larger side of the cross sectional area of the pseudo-land portion close to the portion of the first slant groove opened to the circumferential groove;

a groove shape, defined be the leading and trailing walls of the first slant groove as it extends toward the circumferential groove, is extended axially inward by a second shape defined by an axially outer edge of the pseudo-land portion and the leading wall of the first slant groove;

the blocks defined by the slant grooves do not extend axially inward of the end part of the pseudo land portion; and said pseudo-land portion is separate and apart from said blocks.

34. A pneumatic tire comprising:

a tread portion provided with at least one circumferential groove extending along a circumferential direction of the tire;

a plurality of slant grooves, each having a leading groove wall and a trailing groove wall, each opening to the circumferential groove and obliquely extending from such an opening position toward a ground contact end of a tread thereby defining blocks; and a pseudo-land portion formed in the circumferential groove so as to promote a smooth inflow of water flowing from the circumferential groove into a first the slant groove of the plurality of slant grooves, wherein:

said pseudo-land portion comprises a slant face on a ground contact side so that said slant face does not contact a ground surface and faces the opening of the first slant groove;

the opening of the first slant groove is between the slant face and the leading wall of the first slant groove;

the pseudo-land portion is arranged adjacent to a first groove wall of the circumferential groove not opened to the slant groove;

the pseudo-land portion is arranged in the circumferential groove so as to provide an end part at a larger side of the cross sectional area of the pseudo-land portion close to the portion of the first slant groove opened to the circumferential groove;

a groove shape, defined by the leading and trailing walls of the first slant groove as it extends toward the circumferential groove, is extended axially inward by a second shape defined by an axially outer edge of the pseudo-land portion and the leading wall of the first slant groove;

the blocks defined by the slant grooves do not extend axially inward of the end part of the pseudo land portion; and said pseudo-land portion is separate and apart from said blocks.

* * * * *